May 6, 1958  A. B. NOVESKY  2,833,479
THERMOSTATIC EXHAUST PRESSURE REGULATOR
Filed Oct. 2, 1956
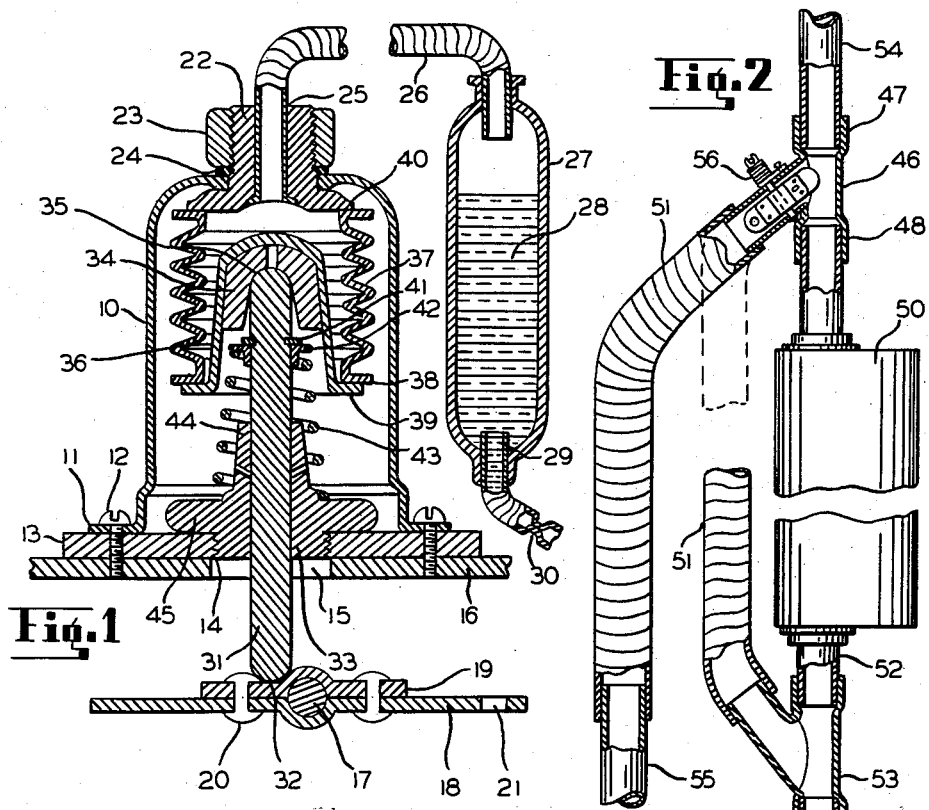
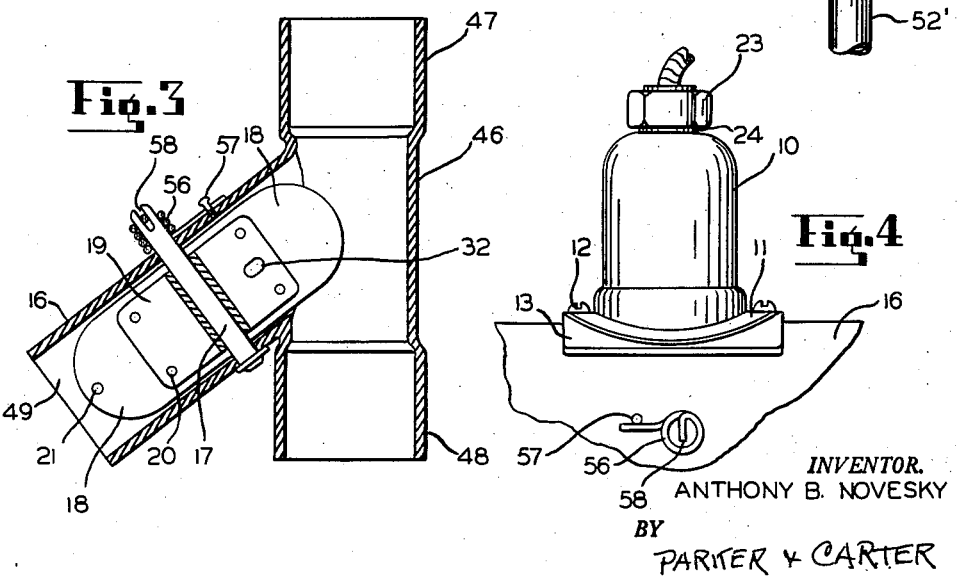
INVENTOR.
ANTHONY B. NOVESKY
BY
PARKER & CARTER
ATTORNEYS

United States Patent Office 2,833,479
Patented May 6, 1958

2,833,479
THERMOSTATIC EXHAUST PRESSURE REGULATOR

Anthony B. Novesky, Milwaukee, Wis.

Application October 2, 1956, Serial No. 613,564

3 Claims. (Cl. 236—99)

My invention relates to exhaust pressure regulators and more particularly to a pressure regulator that may be installed in any standard exhaust system of an internal combustion engine. When the normal capacity of a muffler is inadequate, the back pressure will interfere with the elimination of the exhaust gases from the combustion chamber resulting in loss of power, loss of efficiency and poor economy.

One of the principal objects of the invention is to provide means for automatically by-passing an exhaust muffler partially, to an extent depending upon the temperature developed by back pressure in the exhaust system.

Another object of my invention is to provide a device which is primarily an aid in eliminating or reducing the exhaust back pressure, thereby eliminating excessive high temperatures so detrimental to an internal combustion engine.

Still another object of my invention is to provide a device of the character described, which may be used with any type of engine, either a stationary engine, or one for an automotive vehicle, burning gasoline, fuel oil, or the like.

Other and further objects of my invention will become more apparent as the description proceeds when taken in conjunction with the drawings, in which—

Figure 1 is a longitudinal cross-section of the principal parts of a device constructed in accordance with my invention;

Figure 2 is a fragmentary cross-section view of the device applied to a standard exhaust system, showing how it may be applied to a single exhaust by by-passing the muffler, or in a dual exhaust system;

Figure 3 is a longitudinal cross-section of the damper portion of the device, which is capable of insertion in a standard exhaust pipe, and Figure 4 is an exterior side view of the device as applied to an exhaust pipe.

Similar characters of reference indicate corresponding parts throughout the several views and referring now to the same, the character 10 shows a bell-shaped housing which has an opening at the top and is flanged at 11 at the bottom. This flange may be secured as by screws 12 to a base 13. This base 13 has an opening 14 at its center disposed in alignment with an opening 15 drilled through the side wall on the tubular wall 16 of an exhaust pipe leading from na internal combustion engine. The wall 16 has a transverse shaft 17 pivotally mounted at opposite ends which shaft supports a valve or damper 18 by means of a thrust pad 19 encircling a portion of the shaft 17 while the damper, or valve 18, encircles the other portion of the shaft 17. The thrust pad and the damper may be held in engagement with each other by rivets 20. Said damper 18 is also provided with a small port 21 at one of its ends.

The housing 10 has a bellows head 22 extending through its upper end, secured to the latter by a lock nut 23. A washer 24 is disposed between nut 23 and the upper surface of the housing 10 to seal the top opening in said housing.

The bellows head 22 has a tubular sleeve 25 extending therethrough and connected to a flexible tubular member 26. The latter member leads to a gas charged thermo-bulb 27 having a body of liquid 28 therein. The bulb 27 has an outlet 29 at its bottom which is sealed at 30.

A push rod 31 extends downward from the housing 10 to contact a recess 32 on the thrust pad 19 of damper 18. Said push rod passes through a bushing 33 threaded in and passing through the lower opening 14 in the base plate 13. The upper end of the push rod 31 engages a bell-shaped member 34 which is open at its bottom and has an arcuate bearing surface 35 at its top. The member 34 is mounted in a larger bell-shaped housing 36 which has a lower flange 39 supporting the lower end 38 of a flexible bellows 37. The upper end 40 of the bellows is closed by the bellows head 22. The push rod 31 is also provided with a lock ring 41 supporting a retainer 42 which engages the upper end of a conically shaped spring member 43 surrounding a tubular bearing portion 44 of the bushing 33 which also has a flange member 45 resting on the upper face of the base member 13, and on which flange the spring member 43 is seated.

The exhaust pipe 16 may be of conventional cylindrical shape extending outwardly at an angle from a tubular member 46 which has an enlarged receiving portion 47 at one end and another receiving portion 48 at the other end. The body 16 is open at its outwardly extending end 49 and is arranged to be inserted either into a tail or exhaust pipe of an internal combustion engine.

The tubular member 46 is placed ahead of the muffler 50 in Figure 2. A flexible tube 51 may lead from the open end 49 of the body portion 16 to a Y member 53 inserted between pipes 52 and 52' of the tail piece, as indicated partly in dotted lines in Figure 2, so as to by-pass the muffler 50. Also, if desired, the flexible tube 51 may lead from the body 16 of the device to an auxiliary tail pipe 55 when dual tail pipes are used, in which case the exhaust gases could pass through the exhaust pipe 54 and through the muffler 50 out of the conventional tail pipe 52 and also be by-passed to the auxiliary exhaust pipe 55.

A coil or torque spring 56 has one end which is held in engagement with a lug 57 on the side of the body 16, its other end extending into a slot 58 on the outwardly extending end of the shaft 17, so as to urge the valve normally toward its closed position.

Opening of valve 18 is automatically controlled by the thermo-bulb 27 which is disposed in any suitable position where it will be responsive to the temperature of the exhaust system. As the gases in the thermo-bulb 27 are heated they will slowly expand the bellows 37 which results in moving the push rod 31 to open the damper 18. The aperture 21 in the damper 18 will always permit a certain amount of exhaust gas to pass through the damper for the semi-relief of gases, and reduction of condensation in the pass outlet, and to modify the sound of the exhaust as it leaves the tail pipe.

The aperture 21, or the damper itself when opened, also allows a certain inflow of fresh cooler air to the valve chamber of the engine by atmospheric pressure during deceleration of the engine. Such action cools the valve chamber region, its components, aids in the exhaust gas scavenging action, reduces contamination of the incoming fuel charge and thereby improves the combustion.

The aperture 21 in the damper 18 when the damper is closed upon sudden or slight acceleration or slow cruising speed serves as a semi-relief of the exhaust gases by way of the by-pass flexible tube 51 and modifies the sound as it leaves the tail pipe.

Although I have shown and described certain embodiments of my invention, it will be understood that the invention is not limited to the exact constructions shown and described herein, but that various changes and modifications may be made without departing from the spirit and scope of the invention as defined in the appended claims.

I claim:

1. A device of the character described comprising, a tubular body open at both ends, a tubular side member extending outward from said body, said tubular side member being open at both ends and in communication with the inner portion of said tubular body, said tubular side member provided with an opening through its wall, a housing open at its bottom and having a port at its top, a base plate having an opening therethrough, said base plate arcuated on its under face to fit the contour of said tubular member and attached thereto with the opening in said base plate in direct alignment with the opening in the wall of said tubular member, a cylindrical bellows disposed within said housing with one end fixed to the upper end thereof, a push rod, means in said housing urging the upper end of said push rod into engagement with lower end of said bellows, a damper pivotally mounted within said tubular side member, resilient means on the wall of said side member body for urging said damper into a closed position, said push rod extending through the opening in said base plate and in the wall of said tubular body into engagement with the upper face of said damper, and a gas charged thermo-bulb filled with temperature affected volatile liquid, the inside of said thermo-bulb being connected with the bellows through the port in the upper end of said housing.

2. A device of the character described consisting of a tubular body provided with a damper, to be used in combination with a thermo-bulb for actuating said damper, said device comprising a tubular enclosure open at both ends equipped with a side member open at its outer end, said side member having an opening through its wall, a damper pivotally mounted within said side member, a housing having one end mounted on said side member; and a tubular duct extending from the port in said housing to said thermo-bulb, a cylindrical bellows supported within said housing, a push rod disposed between said bellows and said damper, resilient means disposed between said damper and said side member for urging said damper to a closed position within said side member, resilient means for urging said push rod toward the bottom of said bellows, means for sealing the bottom of said bellows within said housing and means for attaching said housing to said tubular side member with the push rod in direct alignment with, and passing through the opening in the side wall of said side member for contact with the face of said damper.

3. A device of the character described to be used in combination with a thermo-bulb for its actuation, said device comprising an enclosure consisting of a tubular member open at both ends and a tubular side member extending outward therefrom in angular relation thereto, said side member provided with an opening through its wall, a housing mounted on said side member and provided with a port at its upper end, a cylindrical bellows disposed within said housing, a retainer closed at its upper end and open at its lower end, the upper end of said retainer being arcuate, the lower end of said retainer having an outwardly extending flange, said retainer extending into said bellows, the flange of said retainer engaging the lower end of said bellows, the upper end of said bellows being fixed to the outer face of said housing, a push rod having its upper end seated in the arcuate upper end of said retainer, a guide for said push rod mounted on the lower end of said housing, resilient means in said housing engaging said push rod for urging the upper end of said push rod toward said retainer, a shaft extending laterally through and journalled in the walls of said tubular side member, a valve plate mounted on said shaft within said tubular side member, resilient means for normally urging said valve plate into closed position toward the lower end of said push rod, a tubular member leading from said thermo-bulb through the port in said housing, and into said bellows, for actuating said valve.

References Cited in the file of this patent

UNITED STATES PATENTS

| | | |
|---|---|---|
| 1,292,194 | Wilhelm | Jan. 21, 1919 |
| 1,528,788 | Rayfield | Mar. 10, 1925 |
| 1,986,405 | Mears | Jan. 1, 1935 |
| 2,736,501 | Widell | Feb. 28, 1956 |